(12) United States Patent
Shin

(10) Patent No.: US 6,334,500 B1
(45) Date of Patent: Jan. 1, 2002

(54) SLIP CONTROL METHOD FOR TRACTION CONTROL SYSTEM

(75) Inventor: Dong-Chul Shin, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/472,171

(22) Filed: Dec. 27, 1999

(30) Foreign Application Priority Data

Feb. 19, 1999 (KR) .............................................. 99-5468

(51) Int. Cl.$^7$ .............................................. B60K 23/00
(52) U.S. Cl. ......................... 180/197; 180/244; 701/85
(58) Field of Search .................................. 180/197, 233, 180/244; 701/82, 85, 90

(56) References Cited

U.S. PATENT DOCUMENTS

| | | | |
|---|---|---|---|
| 5,701,247 A | * 12/1997 | Sasaki | 180/197 |
| 5,805,449 A | * 9/1998 | Ito | 364/424.051 |
| 5,839,083 A | * 11/1998 | Sugiyama | 701/62 |
| 6,115,663 A | * 9/2000 | Yasuda | 701/89 |
| 6,199,005 B1 | * 3/2001 | Iwata | 701/87 |

* cited by examiner

Primary Examiner—Avraham H. Lerner

(57) ABSTRACT

A slip control method for a traction control system (TCS) used in vehicles. The method includes the steps of generating variables for controlling engine output according to speeds of each wheel after a drive state is determined using wheel speeds, a throttle valve opening, and an accelerator pedal position; determining whether the TCS requires activation or de-activation according to the generated variables and the determined drive state; generating a first control variable for traction control after performing initial traction control if it is determined that immediately previous traction control was not performed, and directly generating a second control variable for traction control if it is determined that immediately previous traction control was performed, the first control variable and the second control variable being generated if it is determined in the previous step that the TCS requires activation; and controlling drive wheel speed through engine output control, the engine output control being performed by varying the throttle valve opening according to either the first control variable or the second control variable.

12 Claims, 5 Drawing Sheets

SLIP CONTROL METHOD FOR TRACTION CONTROL SYSTEM

BACKGROUND OF THE INVENTION (a) Field of the Invention

The present invention relates to a slip control method for a traction control system (TCS) used in vehicles.

(b) Description of the Related Art

A TCS is provided in some vehicles to prevent the spinning of drive wheels on a slippery road surface. In particular, the TCS provides both traction control, which prevents excessive slipping of the drive wheels on a road when accelerating or starting from a stopped state to thereby improve acceleration performance, and trace control, which maintains the vehicle in a desired cornering radius such that cornering performance is enhanced. Such capabilities are typically performed by the TCS by controlling drive power transmitted to the drive wheels from the engine. Accordingly, TCSs act both as a vehicle performance enhancer and a safety device.

The different types of TCSs include a system which controls brake pressure; a system which varies ignition timing and fuel injection amounts, thereby controlling engine output; a system which controls the throttle valve to control engine output; and a system which uses a mixture of two or more of these methods. The system which controls the throttle valve to control engine output is again classified into two types: a main throttle actuator (MTA) system and a twin throttle body system (TTS).

When utilizing the TTS, both a main throttle valve and a TCS auxiliary throttle valve are mounted on the vehicle. The TCS auxiliary throttle valve is linked with the main throttle valve, then is electrically driven when slipping of the drive wheels on the road surface occurs. By electrically driving the auxiliary throttle valve, the problem of reaction time delays experienced with conventional throttle valves is overcome.

However, the application of the TTS necessitates complicated changes in the wiring and engine. Also, a TCS algorithm must be added to an engine control unit when using either the TTS or the method in which fuel injection is controlled. Finally, in the conventional TCS, information related to the shifting of gears is received from a TCU so that engine output can be controlled. As a result, when applying the TCS to a vehicle equipped with a manual transmission, since no means to supply such information to the TCS is available, a separate algorithm which calculates gearshift data based on vehicle driving states must be used. This leads to compatibility problems with regard to the algorithm since each vehicle is different.

SUMMARY OF THE INVENTION

The present invention has been made in an effort to solve the above problems.

It is an object of the present invention to provide a slip control method for a traction control system used in a vehicle in which, without the use of separate drive data, an opening degree of a main throttle valve is controlled when drive wheel slippage is detected such that engine output is controlled, thereby preventing the slipping of the drive wheels, and ultimately improving vehicle performance and enhancing vehicle safety.

To achieve the above object, the present invention provides a slip control method for a TCS used in vehicles. The method comprises the steps of generating variables for controlling engine output according to speeds of each wheel after a drive state is determined using wheel speeds, a throttle valve opening, and an accelerator pedal position; determining whether the TCS requires activation or de-activation according to the generated variables and the determined drive state; generating a first control variable for traction control after performing initial traction control if it is determined that immediately previous traction control was not performed, and directly generating a second control variable for traction control if it is determined that immediately previous traction control was performed, the first control variable and the second control variable being generated if it is determined in the previous step that the TCS requires activation; and controlling drive wheel speed through engine output control, the engine output control being performed by varying the throttle valve opening according to either the first control variable or the second control variable.

According to a feature of the present invention, in the step of generating variables for controlling engine output according to speeds of each wheel, a vehicle speed variable is generated as an average speed of rear wheels, a drive wheel average speed variable is generated as an average speed of front wheels (drive wheels), a slip rate variable is generated by subtracting the vehicle speed from a wheel speed and dividing the result by the wheel speed, and the drive wheel which is rotating faster becomes the object for control.

According to another feature of the present invention, in the step of determining whether the TCS requires activation or de-activation, one of the following four conditions must be satisfied to determine that the TCS requires activation: (a) when the vehicle is started from a stopped position, whether a slip ratio of drive wheels is greater than a predetermined first slip ratio, and a vehicle speed is above a predetermined first vehicle speed; (b) when the vehicle is in a normal state of driving, whether an opening degree of a throttle valve is less than that corresponding to a position of an accelerator pedal, and the TCS was previously activated; (c) when the vehicle is in a normal state of driving, whether the TCS was previously in an OFF state, the vehicle speed is greater than a predetermined second vehicle speed, and the slip ratio of the drive wheels is above a predetermined second slip ratio; or (d) when the vehicle is driving on a road surface with an extremely low level of traction, whether the vehicle speed has not reached a predetermined third vehicle speed and an average speed of the front wheels is above a predetermined value; and one of the following three conditions must be satisfied to determine that the TCS requires de-activation: (a) the driver controls a TCS switch to an OFF position; (b) the driver manipulates a brake pedal; or (c) the vehicle speed has reached a predetermined speed.

According to yet another feature of the present invention, the initial traction control is performed using only a vehicle speed in a vehicle with a manual transmission since information related to the transmission of power by a clutch and information of a present state of the transmission can not be known, and in the initial traction control, information to determine road conditions is obtained and a control variable for subsequent TCS control through control of drive wheel speed is generated.

According to still yet another feature of the present invention, the initial traction control comprises the step of controlling the throttle valve opening to a minimal degree according to the vehicle speed to artificially remove excessive slipping at an initial state; and maintaining the throttle valve opening at a predetermined opening degree to remove remaining excessive slipping or prevent the closing of the throttle valve in excess of what is required.

According to still yet another feature of the present invention, in the step of controlling the throttle valve opening to a minimal degree according to the vehicle speed, a time for controlling the throttle valve to the minimal degree from an initial state is determined by TCS ON conditions.

According to still yet another feature of the present invention, in the step of maintaining the throttle valve opening at the predetermined opening degree, if excessive slipping is not reduced below an expected value, the throttle valve is further closed a predetermined amount, and if wheel speed is overly reduced, the throttle valve is opened a predetermined amount.

According to still yet another feature of the present invention, the step of generating the first control variable and the second control variable for traction control further comprises the steps of determining a road condition by monitoring the drive wheels, the road condition being determined by the fastest-rotating drive wheel; determining a target slip rate for the traction control of the drive wheels according to the determined road condition; and determining a gain corresponding to the target slip rate for use in the traction control, the traction control being performed by controlling a rotating speed of the drive wheels according to the gain.

According to still yet another feature of the present invention, in the step of determining the road condition, in the case where the throttle valve is closed according to a control pattern, vehicle speed conditions are compared to determine whether wheel speeds reduce abruptly or smoothly such that road conditions of a high-traction road, slippery road surface (e.g., snowy and icy road conditions), low-traction road, etc. are determined.

According to still yet another feature of the present invention, in the step of controlling the drive wheel speed according to the first control variable and the second control variable, the throttle valve opening for controlling engine output is determined through proportional integration control such that a rotation of the drive wheels corresponds to a target vehicle speed, the proportional integration control utilizing the first control variable and the second control variable.

According to still yet another feature of the present invention, the target vehicle speed is determined from a target slip rate, the target slip rate being determined according to a determined road condition.

According to still yet another feature of the present invention, a control error in the proportional integration control is obtained from a difference between the target vehicle speed and a rotational speed of the faster drive wheel.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
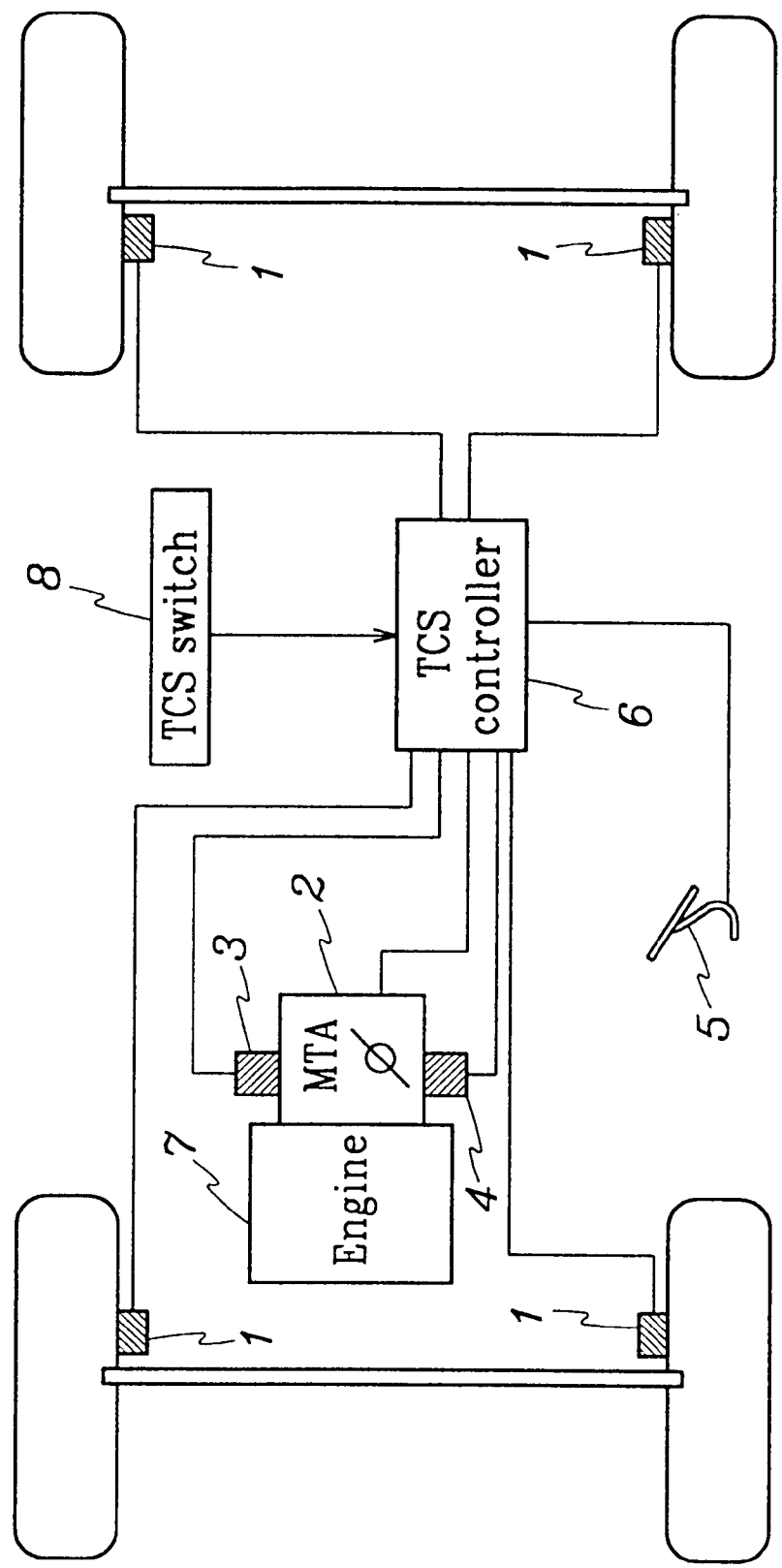
FIG. 1 is a schematic diagram of a vehicle and corresponding elements to which a slip control method for a traction control system according to a preferred embodiment of the present invention is applied.

FIG. 1 is a schematic diagram of a vehicle and corresponding elements to which a slip control method for a traction control system according to a preferred embodiment of the present invention is applied.

Elements to which the slip control method of the present invention is applied include wheel speed sensors 1, an MTA 2, a throttle position sensor 3, an accelerator pedal position sensor 4, a brake switch 5, a TCS controller 6, an engine control unit 7, and a TCS switch 8.

The MTA 2 controls an opening of a throttle valve using a DC motor and four links to thereby act as a throttle valve body. That is, when the TCS is not operating, the MTA 2 operates identically as the conventional throttle valve such that throttle valve opening corresponds directly to driver manipulation of an accelerator pedal. However, when the TCS is operating, throttle valve opening is controlled electrically and not by the depressing of the accelerator pedal by the driver.

One of the wheel speed sensors 1 is provided at each wheel of the vehicle to detect a rotational speed of the wheels. The throttle position sensor 3 detects throttle valve opening. The accelerator pedal position sensor 4 detects a position of the accelerator pedal (i.e., the degree to which the driver has depressed the accelerator pedal). The brake switch 5 is activated by driver manipulation of a brake pedal, and is used to control the TCS to an OFF state.

The TCS controller 6 receives information from the wheel speed sensors 1, the throttle position sensor 3, and the accelerator pedal position sensor 4 to determine whether the TCS needs to be operated, and if it is determined that the TCS requires operation, uses this information to control the MTA 2. The engine control unit 7 controls engine output according to the information received from the throttle position sensor 3 and other information on the driving state of the vehicle. The TCS switch 8, which is operated by the driver, outputs a signal to operate the TCS controller 6. That is, when the driver controls the TCS switch 8 to an ON state, the TCS controller 6 continuously determines whether the TCS should be activated based on the information received as described above.

Figure 2:
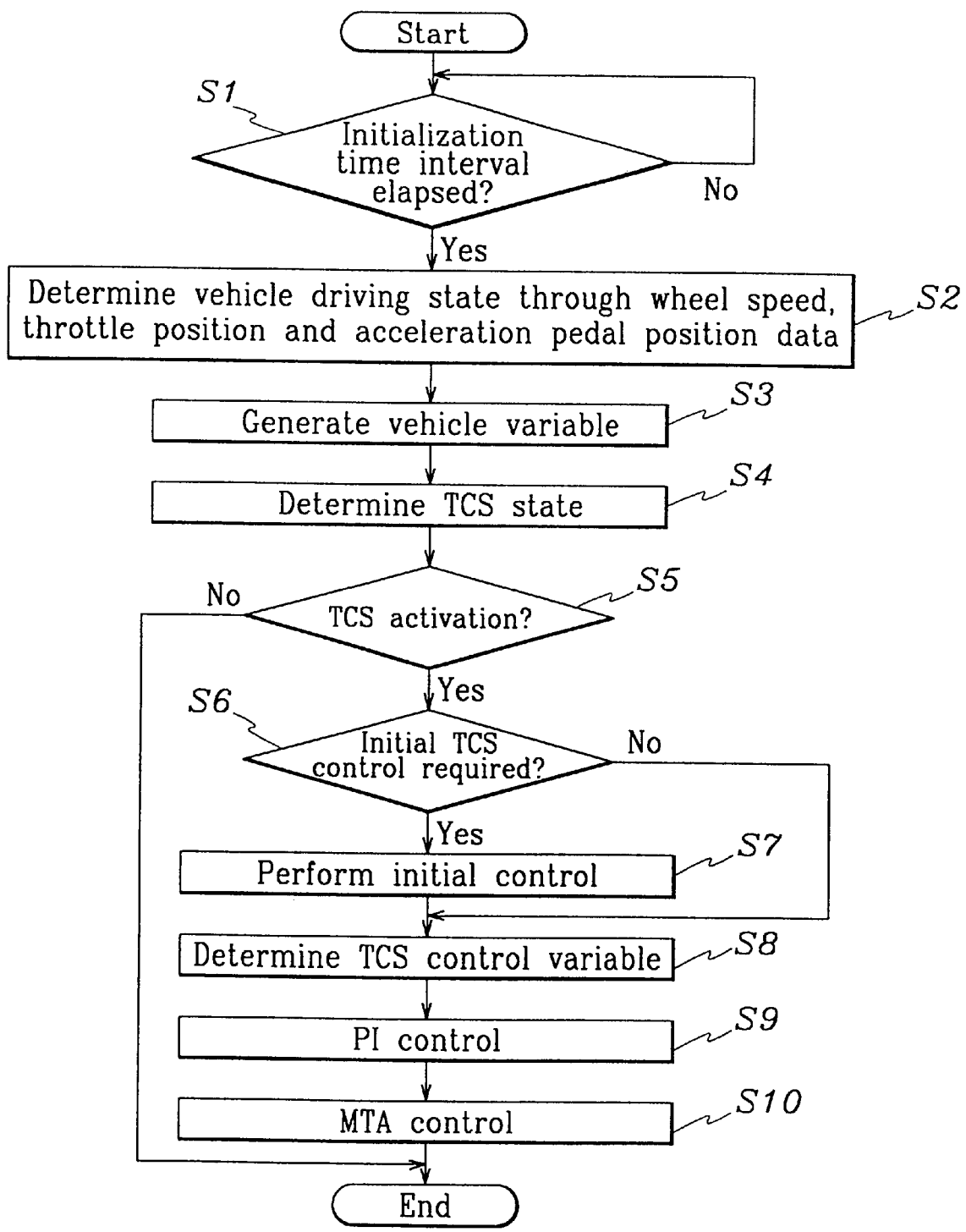
FIG. 2 is a flow chart of a slip control method for a traction control system according to a preferred embodiment of the present invention.

FIG. 2 shows a flow chart of a slip control method for a traction control system according to a preferred embodiment of the present invention.

If power is applied to the TCS controller 6 as a result of the starting of the engine or driver manipulation of the TCS switch 8 to an ON state, the TCS controller 6 initializes all internal data over a predetermined time interval in step S1.

Next, the TCS controller 6 receives data from the wheel speed sensors 1, the throttle position sensor 3, and the accelerator pedal position sensor 4 to determine the overall driving state of the vehicle in step S2.

Following the above, the TCS controller 6 generates a vehicle variable for controlling slipping of the wheels according to the driving state of the vehicle in step S3. That is, a slip ratio ($\lambda$) according to each wheel speed is calculated using Equation 1 below.

$$\text{slip ratio } (\lambda) = (V_{wheel} - V_{vehicle})/V_{wheel} \qquad \text{Equation 1}$$

where $V_{vehicle}$ is vehicle speed and is obtained by an average speed of rear wheels as shown in Equation 2 below, and $V_{wheel}$ is a speed of drive wheels (front wheels) and is obtained from the wheel speed sensors 1. Here, it is assumed that the vehicle is a front-wheel drive.

$$V_{vehicle} = (V_{rl} + V_{rr})/2$$

$$V_{dshaft} = (V_{fl} + V_{fr})/2 \qquad \text{Equation 2}$$

where $V_{rl}$ is a speed of the left rear wheel, $V_{rr}$ is a speed of the right rear wheel, $V_{fl}$ is a speed of the left front wheel, $V_{fr}$ is the speed of the right front wheel, and $V_{dshaft}$ is an average speed of the front wheels (i.e., the drive wheels).

In step S4, the TCS controller 6 determines a TCS state based on the vehicle variable generated as in the above and vehicle drive information, then determines whether the TCS needs to be activated in step S5. That is, in step S5, the TCS controller 6 uses a plurality of predetermined conditions to determine whether the TCS requires activation.

In particular, the TCS controller 6 determines whether the TCS requires activation depending on whether one of the following four conditions are satisfied: (1) when the vehicle is started from a stopped position, whether the slip ratio ($\lambda$) of the drive wheels calculated by Equation 1 is greater than a predetermined slip ratio ($\lambda_{lim1}$, and the vehicle speed $V_{vehicle}$ obtained by Equation 2 is above a predetermined vehicle speed $V_{lim1}$; (2) when the vehicle is in a normal state of driving, whether the opening degree of the throttle valve, detected by the throttle position sensor 3, is less than that corresponding to a position of the accelerator pedal detected by the accelerator pedal position sensor 4, and the TCS was previously activated; (3) when the vehicle is in a normal state of driving, whether the TCS was previously in an OFF state, the vehicle speed $V_{vehicle}$ obtained through Equation 2 is greater than a predetermined vehicle speed $V_{lim2}$, and the slip ratio ($\lambda$) of the drive wheels calculated by Equation 1 is above a predetermined slip ratio ($\lambda V_{lim2}$); and (4) when the vehicle is driving on a road surface with an extremely low level of traction, whether the vehicle speed $V_{vehicle}$ obtained through Equation 2 has not reached a predetermined vehicle speed $V_{lim3}$ and the average speed of the front wheels $V_{dshaft}$ is above a predetermined value.

Further, the conditions used by the TCS controller 6 to determine whether the TCS requires de-activation include (1) the driver controls the TCS switch 8 to an OFF position; (2) the driver manipulates the brake pedal such that a corresponding signal is transmitted to the TCS controller 6 from the brake switch 5; and (3) the vehicle speed $V_{vehicle}$ obtained through Equation 2 has reached a predetermined speed.

In step S5, if it is determined that the TCS requires activation, the TCS controller 6 determines if the TCS was activated previously in step S6. Next, if it is determined that the TCS was not activated previously, the TCS controller 6 performs control of the TCS corresponding to an initial state of the TCS in step S7. However, if in step S6 it is determined that the TCS was activated previously, step S7 is skipped. Next, the TCS controller 6 determines a TCS control variable in step S8.

When performing initial control of the TCS of step S7 in a vehicle with a manual transmission, since information related to the transmission of power by the clutch and information of the present state of the transmission can not be known, control is performed using only vehicle speed obtained through Equation 2, and information to determine road conditions is obtained and a is control variable for subsequent TCS control is generated. That is, when operation of the TCS has started, vehicle speed at the time TCS control is started is used to control throttle valve opening by operation of a motor of the MTA 2 as shown by interval 1 of FIG. 3. Such artificial control is used to remove excessive initial slipping since a reaction of the drive system can not be anticipated due to the fact that information related to the transmission power by the clutch and information of the present state of the transmission is not available in the manual transmission vehicle.

Figure 3:
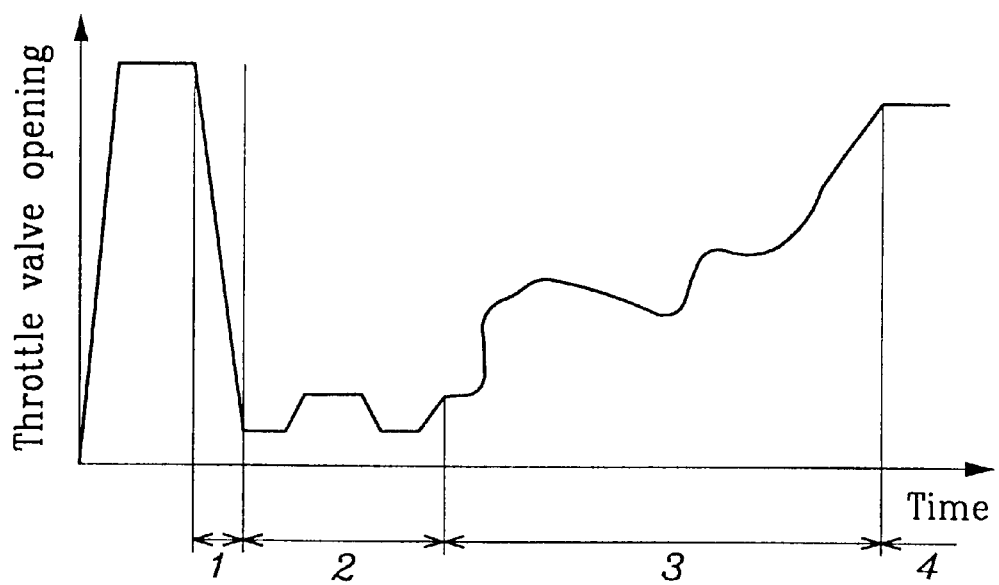
FIG. 3 is a graph illustrating the relation between a throttle valve opening and time according to the slip control method of the present invention.
Figure 4:
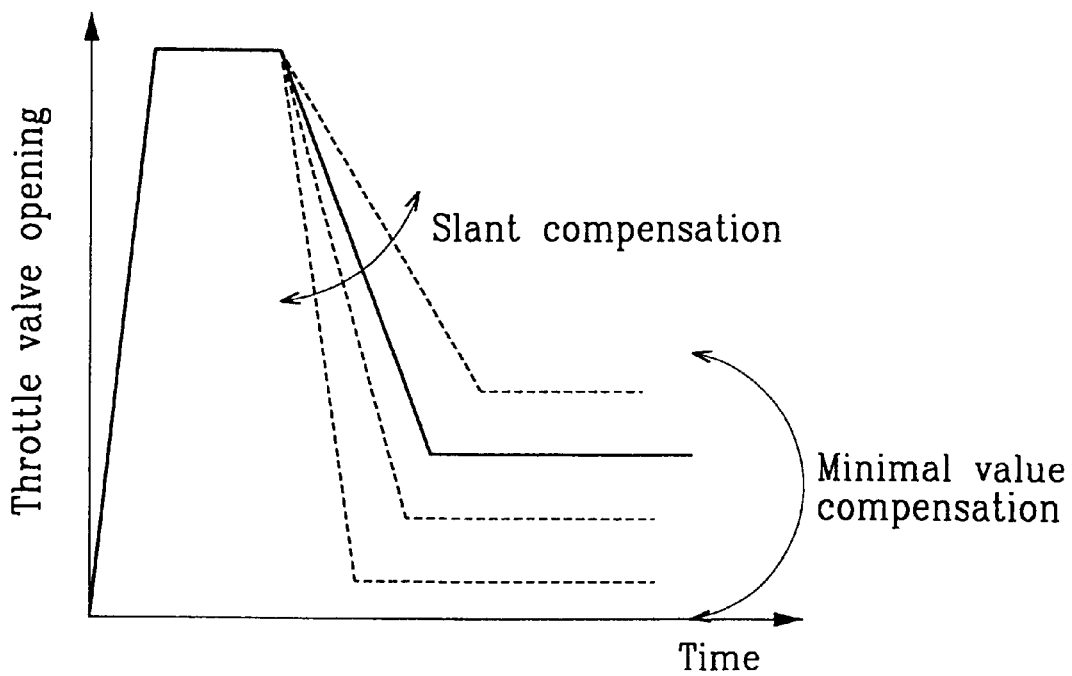
FIG. 4 is a graph illustrating the relation between a throttle valve opening and time at an initial state according to the slip control method of the present invention.

In the above, a minimal opening degree at which the throttle valve is closed is determined by vehicle speed, and the amount of time to close the throttle valve to its minimal opening degree at an initial state corresponds to an angle of slant as shown in FIG. 4, which is determined by TCS ON conditions. Also, in interval 2 of FIG. 3, following the completion of control in interval 1, remaining excessive slipping is removed or the closing of the throttle valve in excess of what is required, which results in a decrease in acceleration performance, is prevented. Namely, after control in interval 1, a position of the throttle valve is maintained for a predetermined time through control of the motor of the MTA 2, then a state of the vehicle is determined. If excessive slipping is not reduced below an expected value, the throttle valve is further closed a predetermined amount by control of the throttle valve motor. However, if wheel speed is overly reduced, the throttle valve is opened a predetermined amount to compensate for the excessive reduction in wheel speed, resulting in the improvement of acceleration performance and overall drive stability. In this state, the engine control unit 7 controls the engine drive power transmitted to the drive wheels according to the throttle valve opening detected by the throttle position sensor 3 (i.e., the throttle valve opening controlled by the MTA 2).

Figure 5:
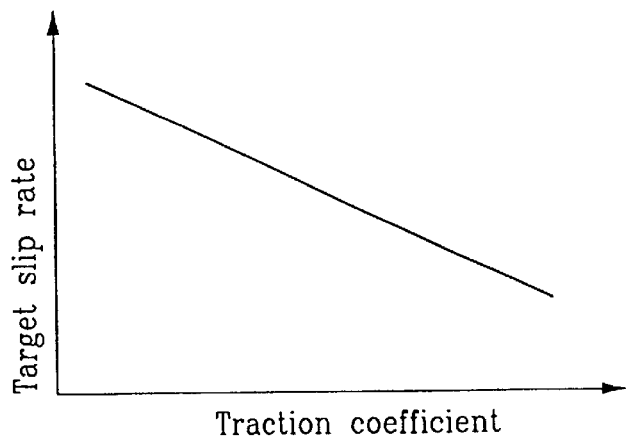
FIG. 5 is a graph illustrating the relation between a target slippage rate according to a road condition according to the slip control method of the present invention.

As described above, after the TCS controller 6 performs initial control of the TCS in step S7, the TCS controller 6 determines a TCS control variable in step S8. In particular, after initial control of the TCS is performed, road conditions are determined by whichever drive wheel (front wheel) is rotating faster. In the case where the throttle valve is closed according to a control pattern, vehicle speed conditions are compared to determine whether wheel speeds reduce abruptly or smoothly so that road conditions such as a high-traction road, slippery road surface (e.g., snowy and icy road conditions), low-traction road, etc. are determined. When road conditions are determined, the TCS controller 6, as shown in FIG. 5, determines a target slip rate for controlling slipping of the drive wheels according to the road condition. Further, with reference to FIG. 6, a proportional integration (PI) gain ($K_p$, $K_i$) is determined according to each vehicle speed based on the road condition determined.

Figure 6A:
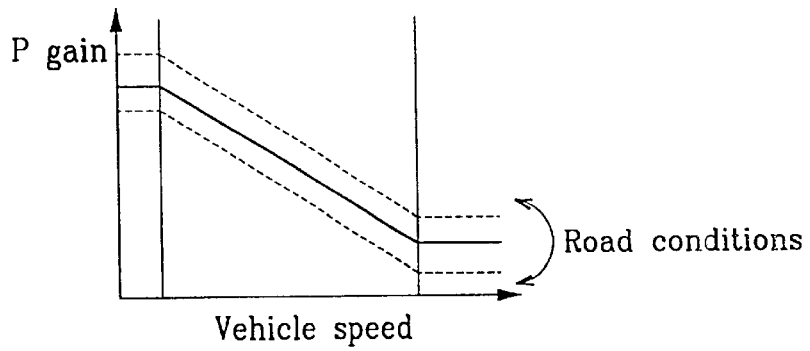
FIG. 6 is a graph illustrating the relation between a gain of proportional integration control and vehicle speed according to the slip control method of the present invention.
Figure 6B:
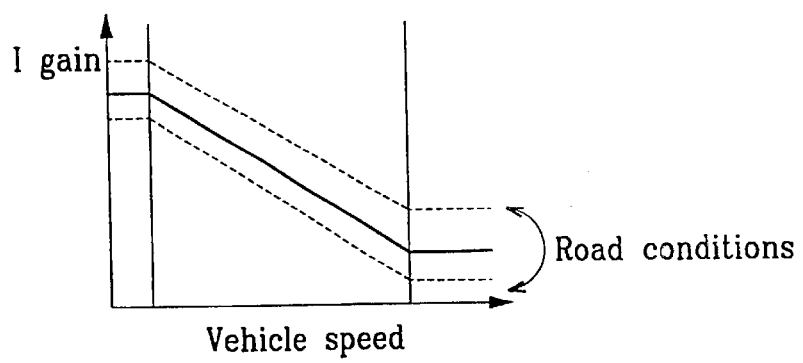
Figure 7:
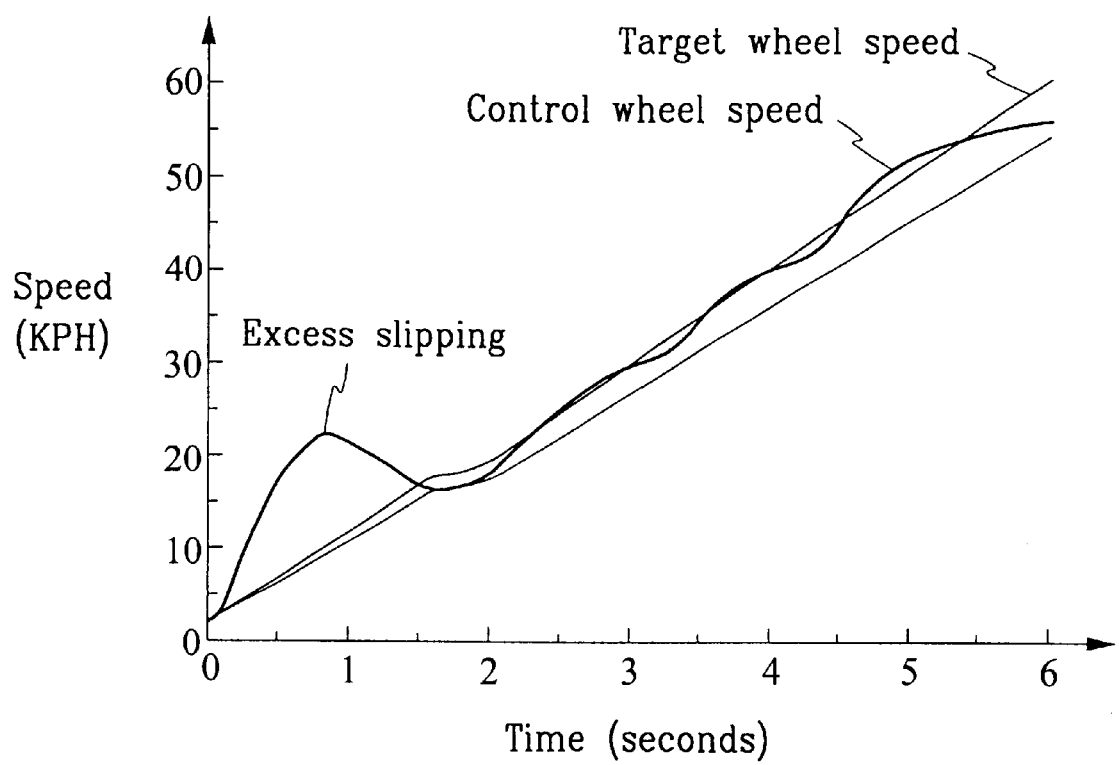
FIG. 7 is a graph illustrating the process by which a drive wheel target speed is obtained according to the slip control method of the present invention.

Subsequently, in step S9, the TCS controller 6 determines an opening degree of the throttle valve for controlling engine output through PI control in which the various variables determined as described above are utilized. That is, a target vehicle speed is determined from the vehicle speed obtained through Equation 2 and the target slip rate determined according to the road condition of FIG. 5, and a signal obtained through Equation 3 below is output such that throttle valve opening can be controlled through operation of the motor of the MTA 2, ultimately controlling engine output to realize the target vehicle speed.

$$\text{OUTPUT}_{control} = K_p * \text{error} + K_i * \int \text{error} * dt \quad \text{Equation 3}$$

where $K_p$ and $K_i$ are gains in PI control of FIG. 6 determined according to each vehicle speed based on the road condition determined; and error is an error of PI control and is calculated by a difference between a target vehicle speed $V_{target\text{-}wheel\text{-}speed}$ and a higher drive wheel speed $V_{selectwheel}$ (i.e., the speed of the faster drive wheel). The error is determined using Equation 4 below.

$$\text{error} = V_{target\text{-}wheel\text{-}speed} - V_{selectwheel} \quad \text{Equation 4}$$

In step S10, using the signal output by the TCS controller 6 and obtained through Equation 3 as described above, the MTA 2 controls its motor such that throttle valve opening is controlled without relation to driver manipulation of the accelerator pedal as shown in interval 3 of FIG. 3. At this time, the engine control unit 7 controls engine output according to the throttle valve opening, which is controlled by the MTA 2 and detected by the throttle position sensor 3, such that the drive wheels rotate at a rate corresponding to the target vehicle speed. As a result, slipping of the drive wheels when abruptly starting from a stopped position and when accelerating is suitably controlled according to the road conditions.

Through such TCS control, vehicle speed reaches a uniform speed as shown in interval 4 of FIG. 3, resulting in meeting one of the conditions for deactivation of the TCS. Accordingly, the TCS controller 6 discontinues TCS control such that throttle opening is controlled solely by driver manipulation of the accelerator pedal.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A slip control method for a traction control system (TCS) used in vehicles comprising the steps of:
   generating variables for controlling engine output according to speeds of each wheel after a drive state is determined using wheel speeds, a throttle valve opening, and an accelerator pedal position;
   determining whether the TCS requires activation or de-activation according to the generated variables and the determined drive state;
   generating a first control variable for traction control after performing initial traction control if it is determined that immediately previous traction control was not performed, and directly generating a second control variable for traction control if it is determined that Immediately previous traction control was performed, the first control variable and the second control variable being generated if it is determined in the previous step that the TCS requires activation; and
   controlling drive wheel speed through engine output control, the engine output control being performed by varying the throttle valve opening according to either the first control variable or the second control variable.

2. The slip control method of claim 1 wherein in the step of generating variables for controlling engine output according to speeds of each wheel, a vehicle speed variable is generated as an average speed of rear wheels, a drive wheel average speed variable is generated as an average speed of front wheels (drive wheels), a slip rate variable is generated by subtracting the vehicle speed from a wheel speed and dividing the result by the wheel speed, and the drive wheel which is rotating faster becomes the object for control.

3. The slip control method of claim 1 wherein during the step of determining whether the TCS requires activation or de-activation, one of the following four conditions must be satisfied to determine that the TCS requires activation: (a) when the vehicle is started from a stopped position, whether a slip ratio of drive wheels is greater than a predetermined first slip ratio, and a vehicle speed is above a predetermined first vehicle speed; (b) when the vehicle is in a normal state of driving, whether an opening degree of a throttle valve is less than that corresponding to a position of an accelerator pedal, and the TCS was previously activated; (c) when the vehicle is in a normal state of driving, whether the TCS was previously in an OFF state, the vehicle speed is greater than a predetermined second vehicle speed, and the slip ratio of the drive wheels is above a predetermined second slip ratio; and (d) when the vehicle is driving on a road surface with an extremely low level of traction, whether the vehicle speed has not reached a predetermined third vehicle speed and an average speed of the front wheels is above a predetermined value; and
   one of the following three conditions must be satisfied to determine that the TCS requires de-activation: (a) the driver controls a TCS switch to an OFF position; (b) the driver manipulates a brake pedal; and (c) the vehicle speed has reached a predetermined speed.

4. The slip control method of claim 1 wherein the initial traction control is performed using only a vehicle speed in a vehicle with a manual transmission since information related to the transmission of power by a clutch and information of a present state of the transmission can not be known, and in the initial traction control, information to determine road conditions is obtained and a control variable for subsequent TCS control through control of drive wheel speed is generated.

5. The slip control method of claim 4 wherein the initial traction control comprises the step of:
   controlling the throttle valve opening to a minimal degree according to the vehicle speed to artificially remove excessive slipping at an initial state; and
   maintaining the throttle valve opening at a predetermined opening degree to remove remaining excessive slipping or prevent the closing of the throttle valve in excess of what is required.

6. The slip control method of claim 5 wherein in the step of controlling the throttle valve opening to a minimal degree according to the vehicle speed, a time for controlling the throttle valve to the minimal degree from an initial state is determined by TCS ON conditions.

7. The slip control method of claim 5 wherein in the step of maintaining the throttle valve opening at the predetermined opening degree, if excessive slipping is not reduced below an expected value, the throttle valve is further closed a predetermined amount, and if wheel speed is overly reduced, the throttle valve is opened a predetermined amount.

8. The slip control method of claim 1 wherein the step of generating the first control variable and the second control variable for traction control further comprises the steps of:

determining a road condition by monitoring the drive wheels, the road condition being determined by the fastest-rotating drive wheel;

determining a target slip rate for the traction control of the drive wheels according to the determined road condition; and determining a gain corresponding to the target slip rate for use in the traction control, the traction control being performed by controlling a rotating speed of the drive wheels according to the gain.

9. The slip control method of claim 8 wherein in the step of determining the road condition, in the case where the throttle valve is closed according to a control pattern, vehicle speed conditions are compared to determine whether wheel speeds reduce abruptly or smoothly such that road conditions of a high-traction road, slippery road surface, low-traction road are determined.

10. The slip control method of claim 1 wherein in the step of controlling the drive wheel speed according to the first control variable and the second control variable, the throttle valve opening for control engine output is determined through proportional integration control such that a rotation of the drive wheels corresponds to a target vehicle speed, the proportional integration control utilizing the first control variable and the second control variable.

11. The slip control method of claim 10 wherein the target vehicle speed is determined from a target slip rate, the target slip rate being determined according to a determined road condition.

12. The slip control method of claim 10 wherein a control error in the proportional integration control is obtained from a difference between the target vehicle speed and a rotational speed of the faster drive wheel.

* * * * *